(12) United States Patent
Lin et al.

(10) Patent No.: US 6,898,030 B1
(45) Date of Patent: May 24, 2005

(54) CAMERA LENS ASSEMBLY

(75) Inventors: Jui-Hsin Lin, Taipei (TW); Ching-Pin Hsu, Taoyuan (TW)

(73) Assignee: Prodisc Technology Inc., Taipei Hsien (TW)

( * ) Notice: Subject to any disclaimer, the term of this patent is extended or adjusted under 35 U.S.C. 154(b) by 0 days.

(21) Appl. No.: 10/868,826

(22) Filed: Jun. 17, 2004

(51) Int. Cl.⁷ .............................................. G02B 7/02
(52) U.S. Cl. .......................... 359/819; 359/740; 396/529
(58) Field of Search ................................. 359/819, 739, 359/740; 396/526; 348/340; 362/455; 353/100

(56) References Cited

U.S. PATENT DOCUMENTS

| | | | | |
|---|---|---|---|---|
| 5,274,456 A | * | 12/1993 | Izumi et al. | 348/335 |
| 5,400,072 A | * | 3/1995 | Izumi et al. | 348/335 |
| 5,673,083 A | * | 9/1997 | Izumi et al. | 348/340 |
| 6,813,099 B2 | * | 11/2004 | Yamaguchi | 359/779 |
| 2002/0005997 A1 | * | 1/2002 | Oba | 359/819 |
| 2002/0154239 A1 | * | 10/2002 | Fujimoto et al. | 348/340 |
| 2003/0193605 A1 | * | 10/2003 | Yamaguchi | 348/335 |
| 2004/0094825 A1 | * | 5/2004 | Onishi et al. | 257/666 |
| 2004/0109079 A1 | * | 6/2004 | Fujimoto et al. | 348/340 |

* cited by examiner

*Primary Examiner*—Ricky Mack
(74) *Attorney, Agent, or Firm*—Birch, Stewart, Kolasch & Birch, LLP

(57) ABSTRACT

A camera lens includes a barrel, a first lens, a second lens and an optical filter module. The barrel includes a first container and a diaphragm. The first lens is disposed in the first container next to the diaphragm. The second lens is disposed in the first container with a distance from the first lens. The optical filter module is disposed in the first container between the first and the second lenses.

14 Claims, 6 Drawing Sheets

CAMERA LENS ASSEMBLY

BACKGROUND OF THE INVENTION

1. Field of Invention

The invention relates to a camera lens assembly and, in particular, to a camera lens assembly, which has an optical filter module positioned between a first lens and a second lens.

2. Related Art

With reference to FIG. 1, a conventional camera lens assembly 1 includes a barrel 11, a first lens 12, a spacer 13, a second lens 14, a blocking filter 15, a sensor 16, and a holder 17.

The barrel 11 connects to the holder 17 and includes a container 111 and a diaphragm 112. The first lens 12 is accommodated in the container 111 and is next to the diaphragm 12. The spacer 13 is accommodated in the container 111 and is next to the first lens 12. The second lens 14 is accommodated in the container 111 and is next to the spacer 13. The blocking filter 15 is set on the holder 17 and is next to the second lens 14.

The sensor 16 is disposed on a substrate 18, which is a printed circuit board or a flexible board. The holder 17 is connected to the substrate 18, wherein the holder 17 is adhered to the substrate 18.

As shown in FIG. 2, since the blocking filter 15 is next to the sensor 16, the particles of the blocking filter 15 may block the light beams passing through the diaphragm 112, the first lens 12 and second lens 14 and entering the blocking filter 15. In this case, part pixels of the sensor 16 cannot receive the light beams, which results in the blocking issue and decreased sensitivity of part pixels. Thus, the image quality is affected. Accordingly, the cleanness requirement for manufacturing the blocking filter 15 is critically concerned, so that the production yield is low and the manufacturing cost is high.

To increase production yield and to decrease manufacturing cost, those skilled people have coated a filter layer on a lens, which is however difficult. Alternatively, the blocking filter 15 is inserted in between the first lens 12 and the second lens 14 and is contacted with the spacer and lenses. However, this method causes assembling error easily. Regarding to the type of the blocking filter 15, a square blocking filter 15 has four corners to be collided with the inner of the camera lens assembly when positioning the square blocking filter 15 into the barrel 11. The collision results in several particles. To avoid the above-mentioned problem, a circular blocking filter 15 can be used. However, the production yield of the circular blocking filter 15 is much lower than that of the square blocking filter 15, so the manufacturing cost of the whole camera lens assembly is increased. In addition, when installing the blocking filter 15 at the end of the barrel 11 facing the sensor 16 and closing to the second lens 14 or at the holder 17, the cleanness requirement for the blocking filter 15 is high, which cannot solve the above problems.

It is therefore a subjective to provide a camera lens assembly, which can solve the above-mentioned problems.

SUMMARY OF THE INVENTION

In view of the foregoing, the invention is to provide a camera lens assembly, which can solve the problem of high manufacturing cost caused by the high cleanness requirement of the filter.

To achieve the above, a camera lens assembly of the invention includes a barrel, a first lens, a second lens, and an optical filter module. The barrel includes a first container and a diaphragm. The first lens is accommodated in the first container and has a first surface next to the diaphragm. The second lens is accommodated in the first container, and an interval is provided between the first lens and the second lens. The optical filter module is accommodated in the first container and is located between the first lens and the second lens.

As mentioned above, the camera lens assembly of the invention installs an optical filter module in between the first lens and the second lens. Comparing with the prior art, the blocking issue would not occur when the sensor receives the light beam(s). Thus, the cleanness requirement of the invention can be reduced. In addition, the assembling error can be decreased, which results in the increased yield of manufacturing the camera lens assembly and the decreased cost of the camera lens assembly.

BRIEF DESCRIPTION OF THE DRAWINGS

The invention will become more fully understood from the detailed description given hereinbelow illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
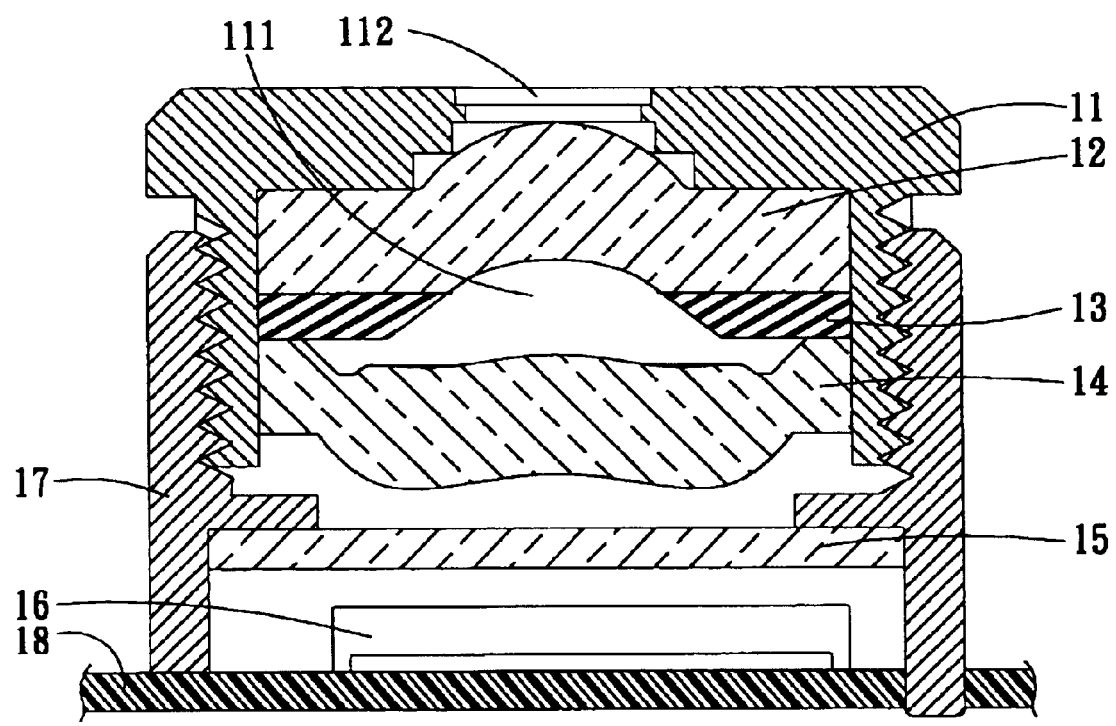
FIG. 1 is a sectional view showing the conventional camera lens assembly.
Figure 2:
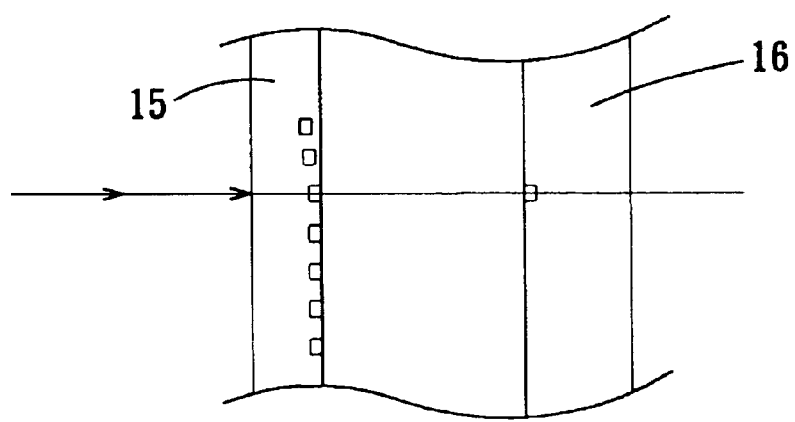
FIG. 2 is a schematic illustration showing an optical path of the conventional camera lens assembly.
Figure 3:
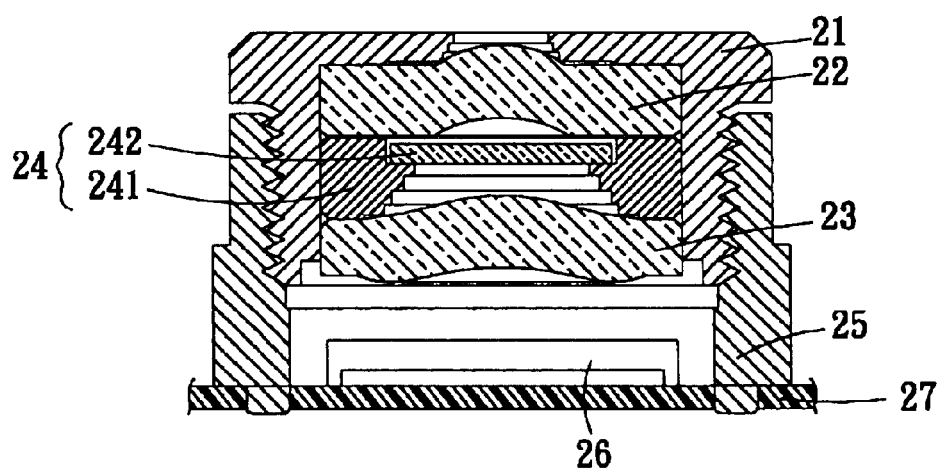
FIG. 3 is a sectional view showing a camera lens assembly according to a preferred embodiment of the invention.
Figure 4:
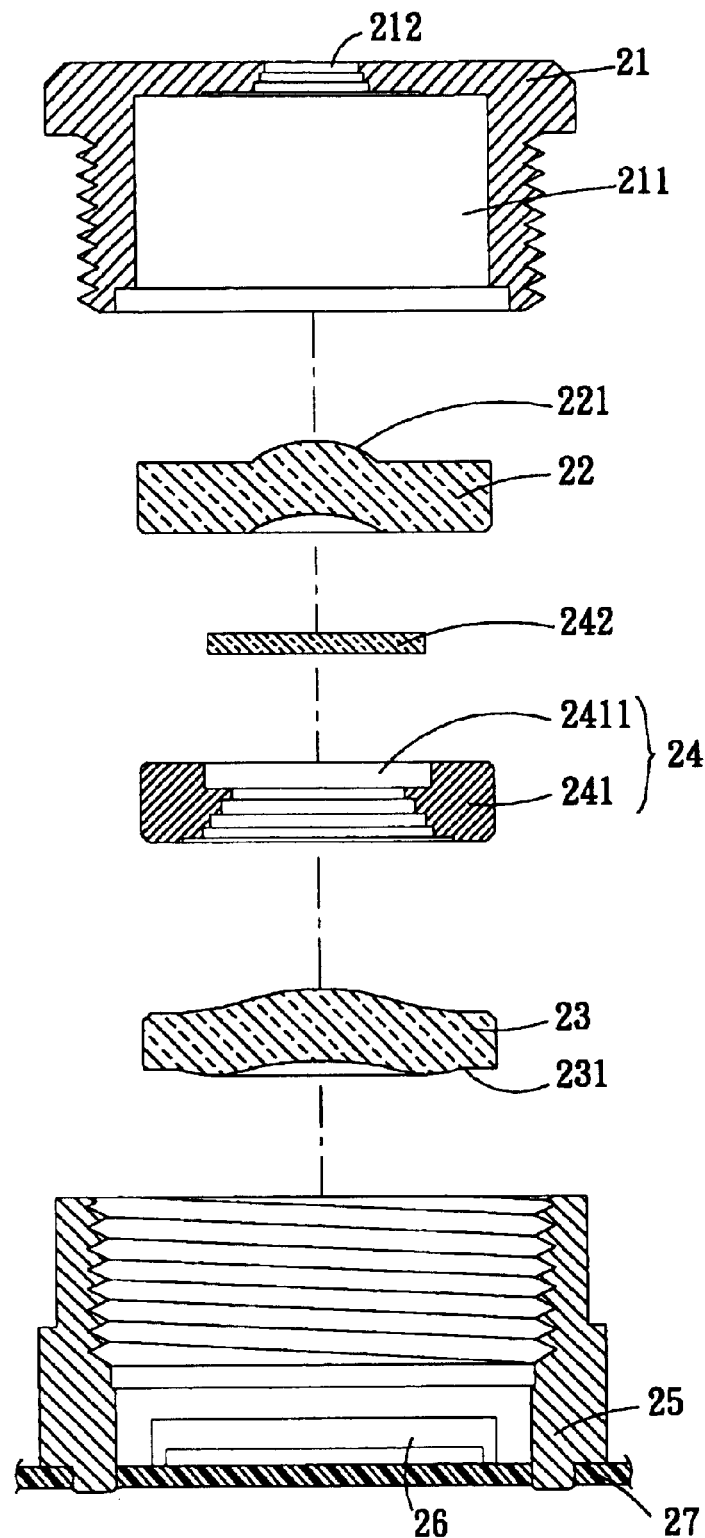
FIG. 4 is a sectional exploded view showing the camera lens assembly according to the preferred embodiment of the invention.

With reference to FIG. 3 and FIG. 4, the camera lens assembly 2 according to the embodiment of the invention includes a barrel 21, a first lens 22, a second lens 23, an optical filter module 24, and a holder 25. The barrel 21 includes a first container 211 and a diaphragm 212, and is connected to the holder 25. The holder 25 connects to a substrate 27 and is adhered to the substrate 27. The substrate 27 is a printed circuit board or a flexible board. In this embodiment, the holder 25 is adhered to the substrate 27 with UV glue. Moreover, other usable method for adhering the holder 25 and the substrate 27 should be included in the scope of the invention.

The first lens 22 is accommodated in the first container 211 and includes a first surface 221. The first surface 221 is a convex surface and is one surface of the first lens 22 next to the diaphragm 212. The first lens 22 can be a glass lens or a plastic lens. In the present embodiment, the first lens 22 is a plastic lens and is an aspherical lens.

The second lens 23 is accommodated in the first container 211, and there is an interval disposed in between the first lens 22 and the second lens 23. The second lens 23 can be a glass lens or a plastic lens. In the embodiment, the second lens 23 is a plastic lens and is an aspherical lens. The second lens 23 includes a second surface 231, which is an anticlastic surface opposite to a surface next to the optical filter module 24.

The optical filter module 24 is accommodated in the first container 211 and is installed between the first lens 22 and the second lens 23. The thickness of the optical filter module 24 may be equal to the interval set between the first lens 22 and the second lens 23. The optical filter module 24 includes a spacer 241 and a filter 242.

The spacer 241 is used to block the undesired (scattered) light beam(s) and has a second container 2411. In the current embodiment, the spacer 241 is an annular plastic object. It should be noted that other usable spacer of different material and shape is included in the scope of the invention.

The filter 242 is accommodated in the second container 2411 for filtering undesired high spectrum light and low spectrum light. The filter 242 could be an infrared rays filter (IR filter), an ultraviolet filter (UV filter), an absorbing filter, or a low pass filter (LPF). In this embodiment, the filter 242 is an infrared rays filter.

The camera lens assembly 2 may further include a sensor 26 installed on the substrate 27. In the present embodiment, the sensor 26 is a complementary metal oxide semiconductor sensor (CMOS sensor).

Figure 5:
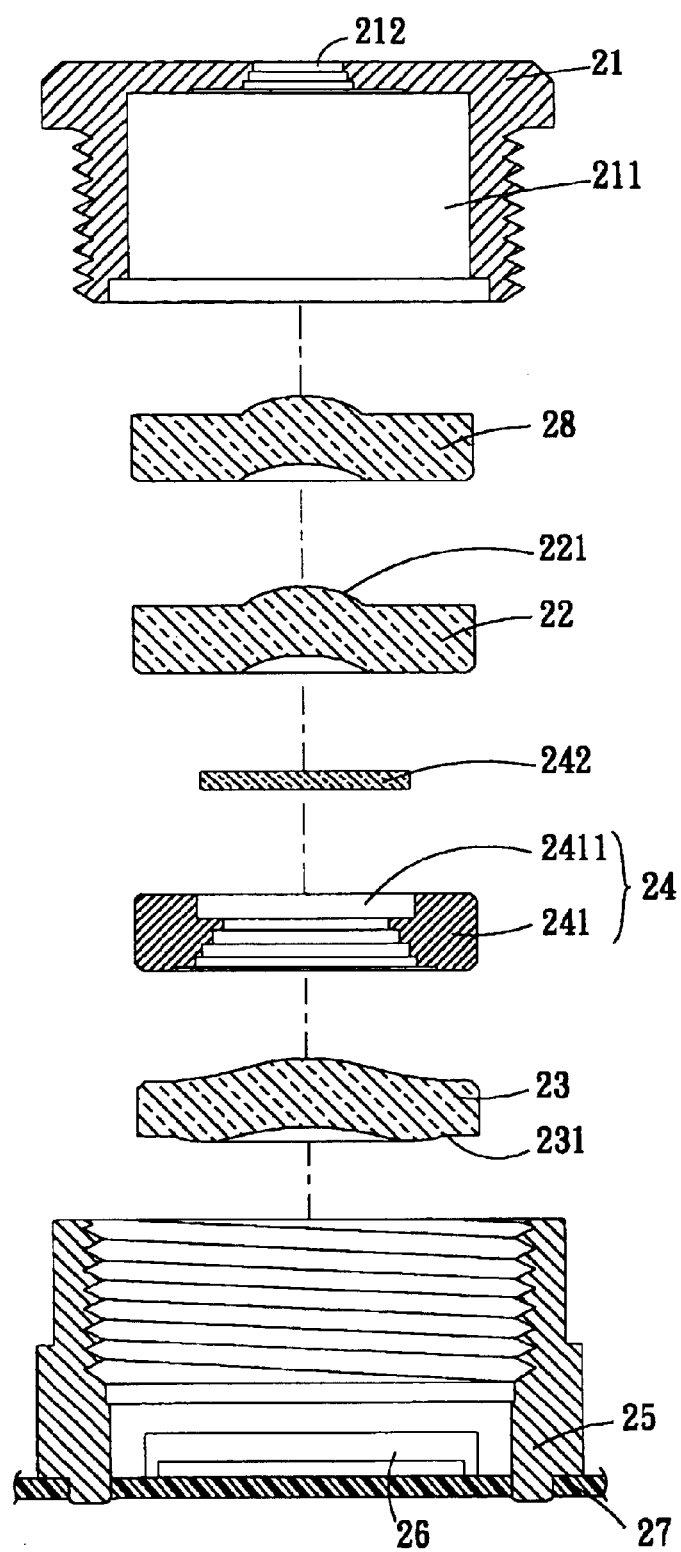
FIG. 5 is another sectional exploded view showing the camera lens assembly according to the preferred embodiment of the invention.

Referring to FIG. 5, the camera lens assembly 2 may further include a third lens 28. The third lens 28 is accommodated in the first container 211 and is located in between the diaphragm 212 and the first lens 22. The third lens 28 is used to enhance the image quality.

Figure 6:
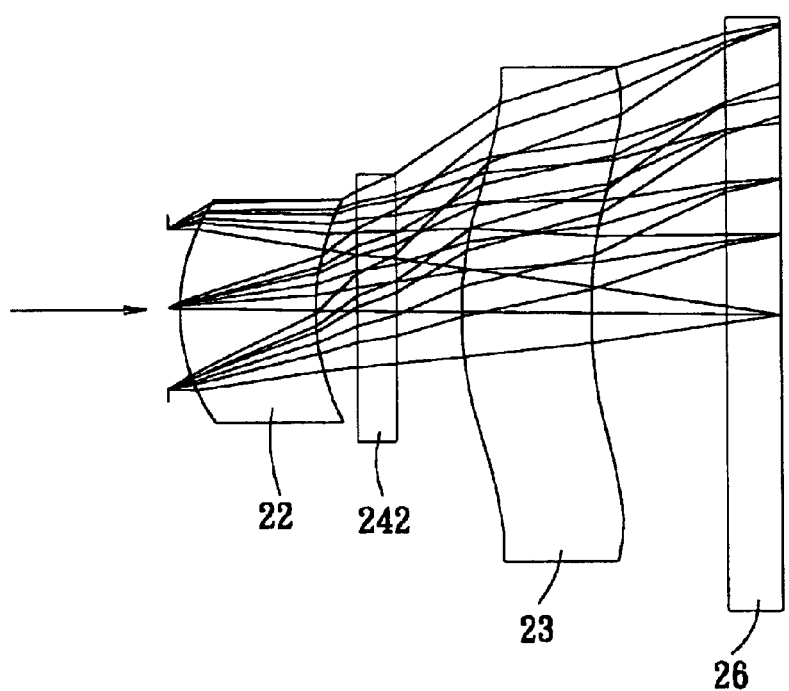
FIG. 6 is a schematic illustration showing an optical path of the camera lens assembly according to the preferred embodiment of the invention.

With reference to FIG. 3 and FIG. 6, since the camera lens assembly 2 of the invention includes an optical filter module 24, which includes a filter 242, installed in between the first lens 22 and the second lens 23, the range of the image, which is constructed by the light beam(s) entering the diaphragm 212 and then passing through the first lens 22, the filter 242 and the second lens 23, can be enlarged. Therefore, the distance between the particles of the filter 242 is enlarged too. The blocking issue of the image caught by the sensor 26, which is caused by the particles of the filter 242, can be greatly reduced. Thus, the cleanness requirement of the filter 242 can be reduced, resulting in the increased production yield and decreased manufacturing cost. In addition, since the filter 242 and the spacer 241 are combined as a single component, the assembling processes of the camera lens assembly 2 become easier. Accordingly, the assembling error of the camera lens assembly 2 can be decreased, which results in the increased yield of manufacturing the camera lens assembly and the decreased cost of the camera lens assembly.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A camera lens assembly, comprising:

a barrel, which has a first container and a diaphragm;

a first lens, which is accommodated in the first container and is next to the diaphragm;

a second lens, which is accommodated in the first container, wherein an interval is disposed between the first lens and the second lens; and an optical filter module, which is accommodated in the first container and is located between the first lens and the second lens.

2. The camera lens assembly of claim 1, wherein the optical filter module comprises a spacer and a filter.

3. The camera lens assembly of claim 2, wherein the filter is an infrared rays filter (IR filter).

4. The camera lens assembly of claim 2, wherein the spacer has a second container, and the filter is accommodated in the second container.

5. The camera lens assembly of claim 1; wherein the first lens is an aspherical lens.

6. The camera lens assembly of claim 1, wherein the first lens is a plastic lens.

7. The camera lens assembly of claim 1, wherein the second lens is an aspherical lens.

8. The camera lens assembly of claim 1, wherein the second lens is a plastic lens.

9. The camera lens assembly of claim 1, wherein the first lens has a convex surface next to the diaphragm.

10. The camera lens assembly of claim 1, wherein the second lens has a surface next to the optical filter module and an anticlastic surface opposite to the surface.

11. The camera lens assembly of claim 1, wherein the thickness of the optical filter module is approximately equal to the interval between the first lens and the second lens.

12. The camera lend assembly of claim 1, further comprising a holder.

13. The camera lens assembly of claim 12, wherein the barrel is connected to the holder.

14. The camera lens assembly of claim 1, further comprising:

a third lens, which is accommodated in the first container and is located in between the diaphragm and the first lens.

* * * * *